United States Patent [19]
Vasudeva

[11] Patent Number: 5,836,430
[45] Date of Patent: Nov. 17, 1998

[54] RATCHET MECHANISM FOR SCREWDRIVERS AND THE LIKE

[75] Inventor: Kailash C. Vasudeva, Waterloo, Canada

[73] Assignee: Maxtech, Inc., Roseville, Mich.

[21] Appl. No.: 782,814

[22] Filed: Jan. 13, 1997

[51] Int. Cl.$^6$ .............................. B25B 15/04; F16D 41/08
[52] U.S. Cl. ................................ 192/43.2; 81/63.1
[58] Field of Search ...................... 192/43, 43.1, 43.2; 81/58, 58.4, 62, 63.1

[56] References Cited

U.S. PATENT DOCUMENTS

| 309,902 | 12/1884 | Watson | 192/43.2 X |
| 968,080 | 8/1910 | Repass | 81/63.1 |
| 1,421,792 | 7/1922 | Linden | 192/43 X |
| 5,582,081 | 12/1996 | Lin | 81/63.1 |

*Primary Examiner*—Richard M. Lorence
*Attorney, Agent, or Firm*—R. Craig Armstrong

[57] ABSTRACT

The ratchet mechanism has a body which is secured to the tool's handle, and an output shaft which extends axially from the distal end of the body. The output shaft has a splined portion which is secured rotatably within a generally cylindrical axial cavity in the distal end of the body. Two pins are mounted to project through the body of the mechanism, on a rocker for example. Depending on the position of the rocker, one or the other or both of the pins extend(s) into the splines. The pins are configured such that one permits rotation of the splined portion in one direction and prevents rotation in the opposite direction, and the other pin permits rotation in the opposite direction and prevents rotation in the first direction. There are thus three operating positions, namely "left", "right" and "locked".

12 Claims, 7 Drawing Sheets

RATCHET MECHANISM FOR SCREWDRIVERS AND THE LIKE

BACKGROUND OF THE INVENTION

This invention relates to hand tools in general, and specifically to a ratchet mechanism for use with screwdrivers, nut drivers, drill chuck keys, and other like tools.

In using a screwdriver to install or remove a screw, multiple revolutions are normally required, which necessitates continually regripping the handle of the screwdriver. This normally requires two hands, and frequently results in the head of the screwdriver having to be repositioned correctly since it tends to become dislodged during regripping, particularly with straight-slotted screws.

SUMMARY OF THE INVENTION

In view of the above, it is an object of the invention to provide a ratchet mechanism for screwdrivers and the like, so that regripping is not necessary. This facilitates one-handed operation, if desired, and provides greater stability to reduce the frequency of repositioning.

In the preferred embodiment of the invention, the mechanism is positioned between the handle and the distal end of the shaft, preferably but not necessarily immediately adjacent the handle. The mechanism has a shank or other suitable means extending from one end thereof, to which the handle is secured, by molding plastic around it, for example. An output shaft extends from the other end thereof. The output shaft may be the actual screwdriver blade, but preferably, for greater flexibility, is a hex socket into which any desired screwdriver or nut-driver bit may be installed. The details of the hex socket and bits are not essential to the invention; the essence of the invention lies in the ratchet mechanism itself.

In the ratchet mechanism, the output shaft has a splined portion which is secured rotatably within a generally cylindrical axial cavity in the distal end of the mechanism's body. Two special pins mounted on a rocker, as will be described in greater detail below, project through the body of the mechanism. Depending on the position of the rocker, one or the other or both of the pins extend(s) into the splines. The pins are configured such that one permits rotation of the splined portion in one direction and prevents rotation in the opposite direction, and the other pin permits rotation in the opposite direction and prevents rotation in the first direction. Thus there are three modes of operation, i.e. ratcheting in one direction, ratcheting in the other direction, and locked with no ratcheting.

Additional features of the invention will be described or will become apparent in the course of the following detailed description.

BRIEF DESCRIPTION OF THE DRAWINGS

The invention will now be described in detail, with reference to the accompanying drawings by way of example only, in which.

DETAILED DESCRIPTION

The ratchet mechanism 1 is positioned between the handle 2 and the distal end of the tool, preferably but not necessarily immediately adjacent the handle. The mechanism has a body 3 with a shank 4 or other suitable means extending from one end thereof, to which the handle is secured, by molding plastic around it, for example. An output shaft 5 extends from the other end thereof. The output shaft may be the actual screwdriver blade, but preferably, for greater flexibility, is configured as a hex socket with a hexagonal axial opening 6 in the distal end thereof, into which any desired screwdriver or nut-driver bit may be installed in any conventional fashion, such as via magnetic retention, ball and clip arrangements, retaining springs, etc.

In the ratchet mechanism, the output shaft 5 has a portion with splines 7. That portion is secured rotatably within a generally cylindrical axial cavity 8 in the distal end of the mechanism's body. The securing may be, for example, by a machine screw 9 which extends through the wall of the body into an annular channel 10 in the output shaft.

Two special pins 11 and 11', mirror images of each other, are mounted on a rocker 12, to project through the body of the mechanism. The rocker can pivot about a lateral pin 13 through the wall of the body, between three positions, which will be referred to herein as LEFT, RIGHT and LOCKED. Instead of a lateral pin 13, set screws through opposite sides of the wall of the body could be used. As another alternative, two balls could be positioned on opposite sides of the rocker, press-fitted in recesses in the wall and rocker. In other words, any means by which the rocker is pivotally mounted would generally suffice.

Ball-spring arrangements, each consisting of a spring 14 and two balls 15 extending into recesses 16 in the body, tend to hold the rocker in one of the three positions, so that the rocker does not accidentally flip from one position to another. The ball-spring arrangements can be on the sides of the rocker as illustrated, or could be at one or both ends of the rocker. One such arrangement could be used instead of two as illustrated. Means other than ball-spring arrangements obviously could be used to achieve the same result, i.e. to restrict the rocker against accidental movement.

In the LEFT position of the rocker, the LEFT pin 11 extends into the splines 7. The pin is configured to permit rotation in the LEFT direction, i.e. counterclockwise, and to prevent rotation in the RIGHT direction, i.e. clockwise. The RIGHT pin is retracted sufficiently by the rocker that it does not engage the splines.

Conversely, in the RIGHT position of the rocker, the RIGHT pin 11' extends into the splines 7. The pin is configured to permit rotation in the RIGHT direction, i.e. clockwise, and to prevent rotation in the LEFT direction, i.e. counterclockwise. The LEFT pin is retracted sufficiently by the rocker that it does not engage the splines.

In the central or LOCKED position, both pins 11 and 11' extend into the splines, so rotation in either direction is prevented, i.e. in the case of a screwdriver, it acts as a conventional non-ratcheting screwdriver.

To retain the pins with their heads 17 in the recesses 18 in the top of the rocker, and to ensure that the pins are urged into the splines, a partially-compressed spring 19 acts against a split-ring washer 20 positioned in a groove 21 in each pin. Other suitable means could be used instead, such as wave springs or plate springs, to achieve the same effect. The pins must of course be allowed to further compress the springs, in order to jump over the raised portions of the splines to achieve the ratcheting effect. In order to prevent the pins from rotating, their heads 17 are non-circular (hexagonal being illustrated as an example), and the recesses 18 correspond in shape.

Figure 1:
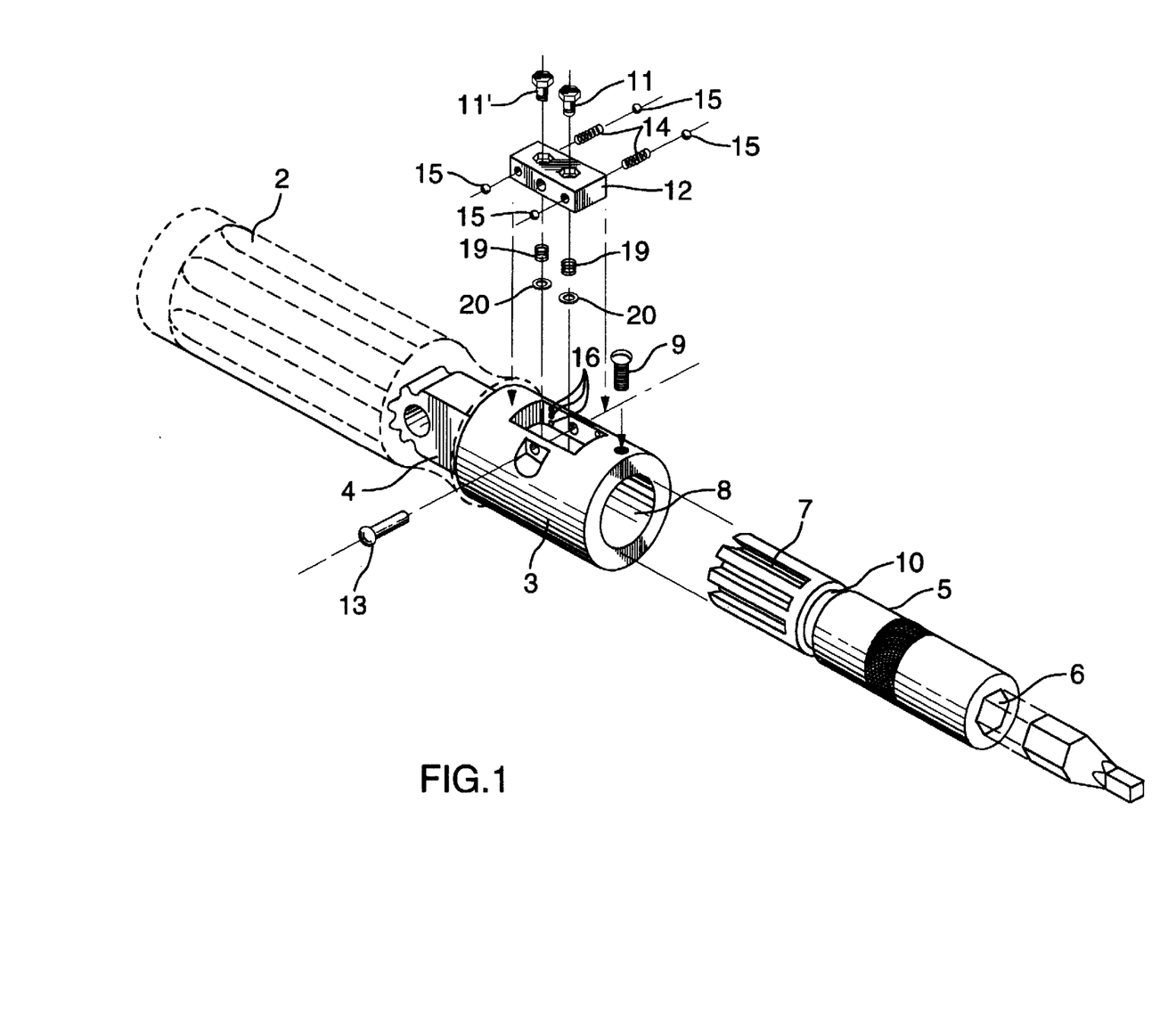
FIG. 1 is an exploded perspective of the preferred embodiment.
Figure 2:
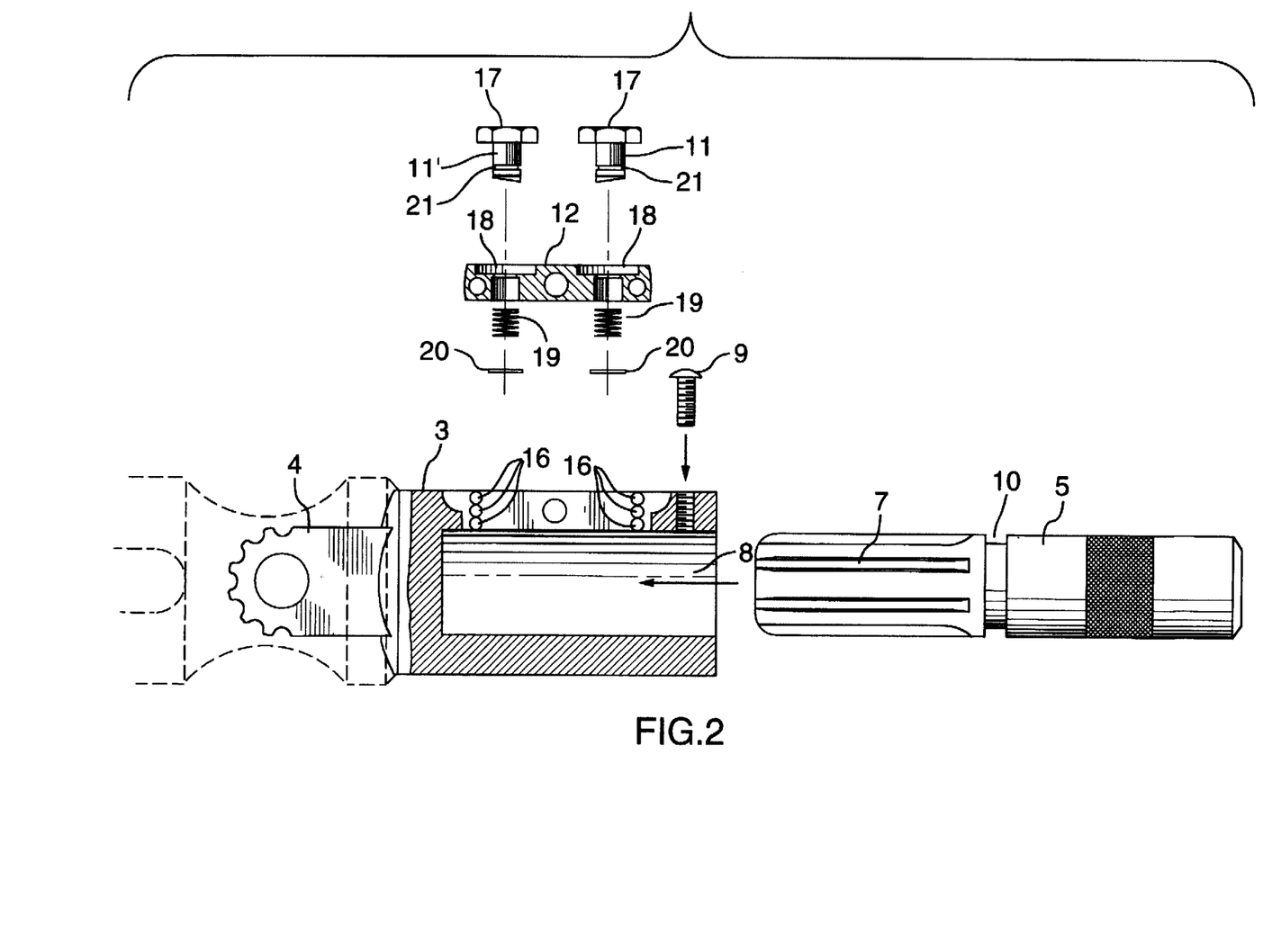
FIG. 2 is an exploded side view, in cross-section.
Figure 3:
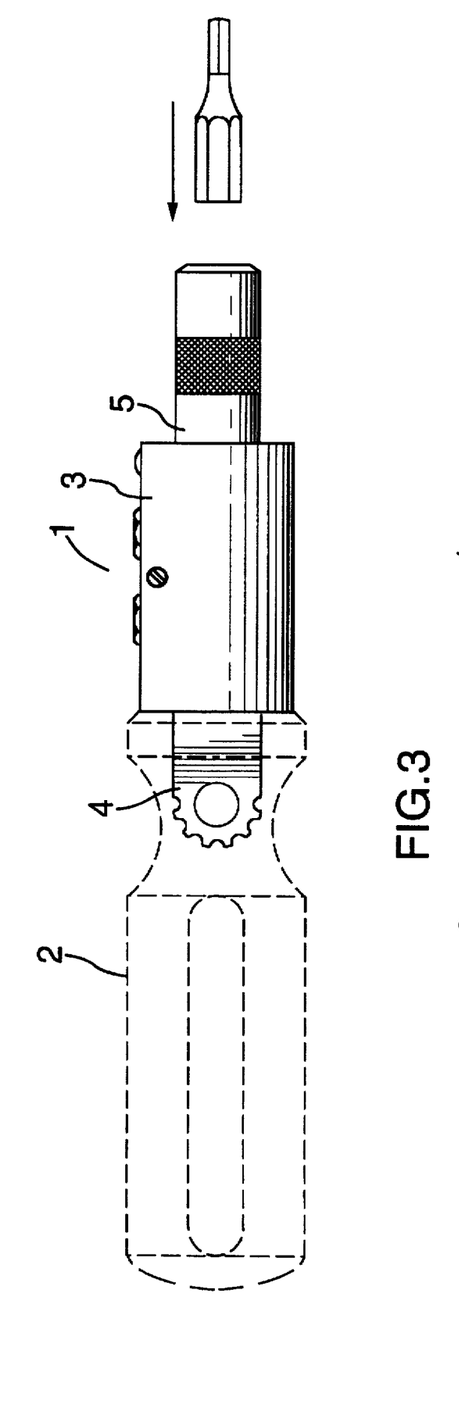
FIG. 3 is a side view of the assembled mechanism.
Figure 4:
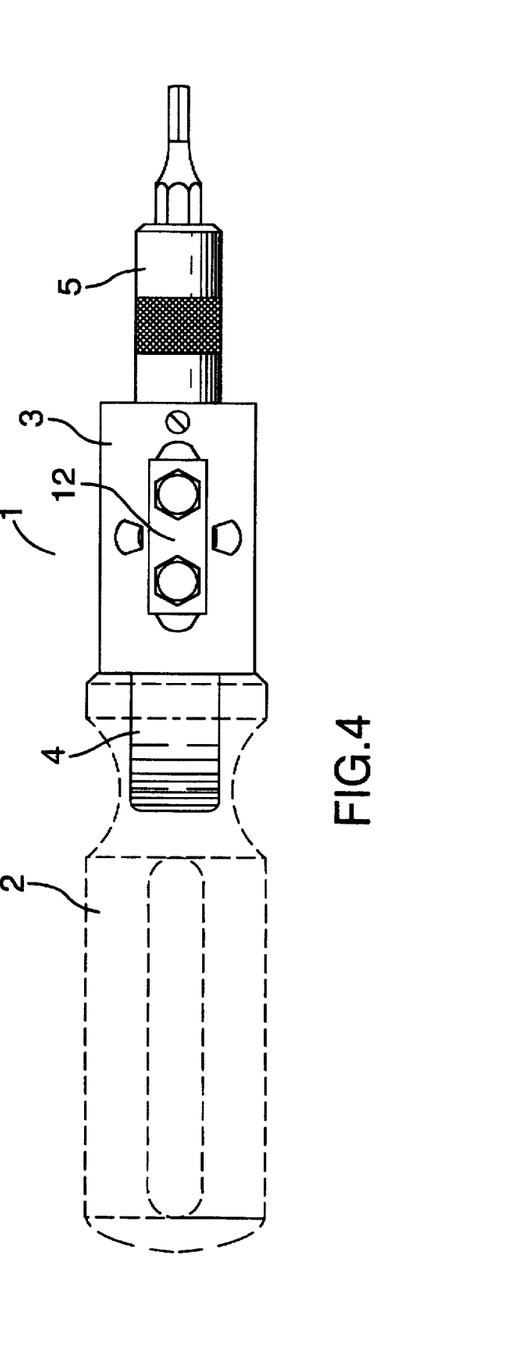
FIG. 4 is a corresponding top view.
Figure 5:
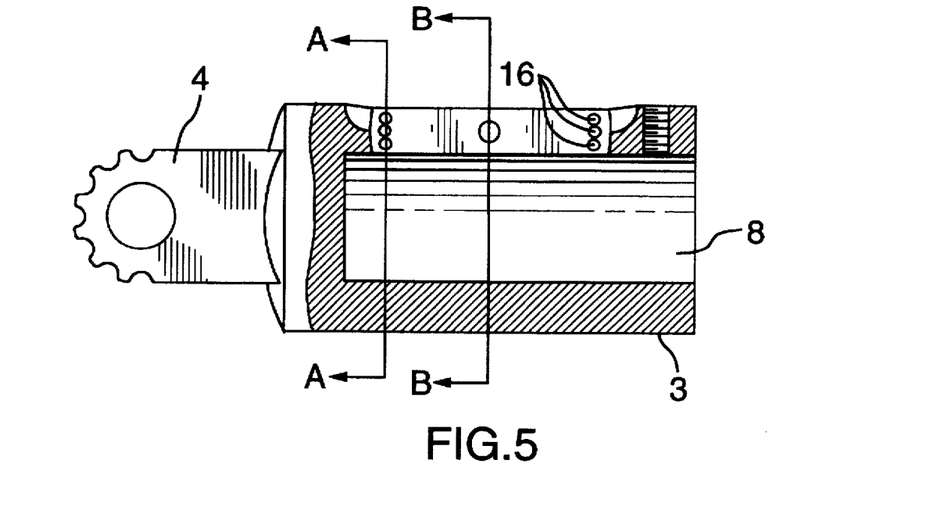
FIG. 5 is a cross-section of the body of the mechanism.
Figure 6:
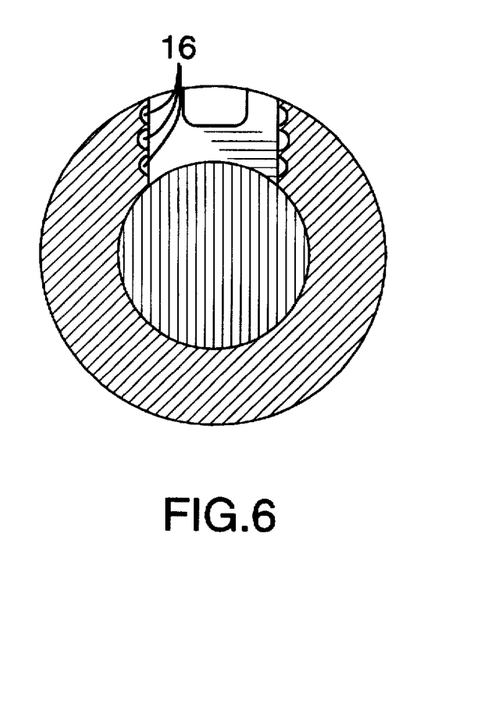
FIG. 6 is a cross-section at A—A of FIG. 5.
Figure 7:
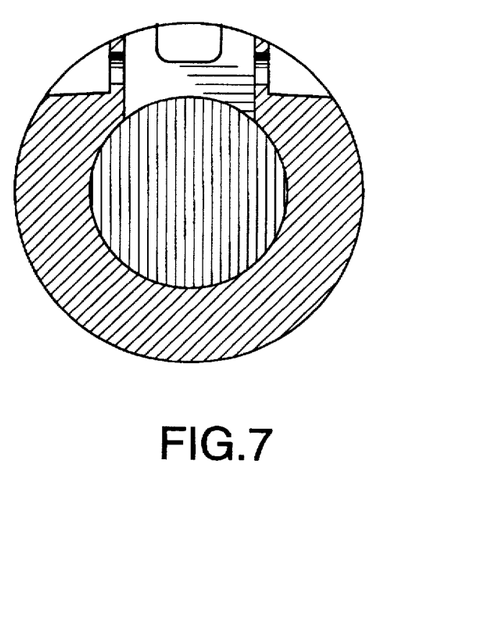
FIG. 7 is a cross-section at B—B of FIG. 5.
Figure 8:
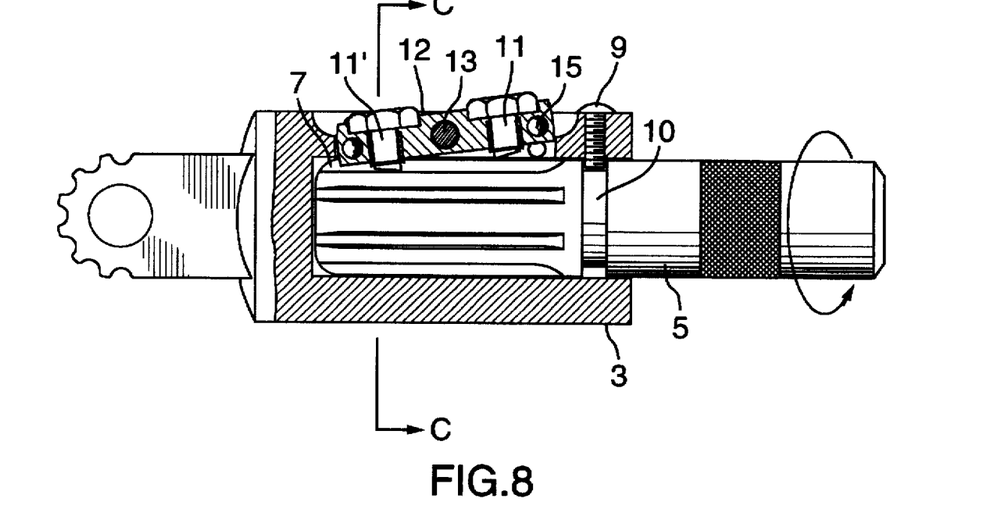
FIG. 8 is a cross-section showing the rocker depressed in one direction.
Figure 9:
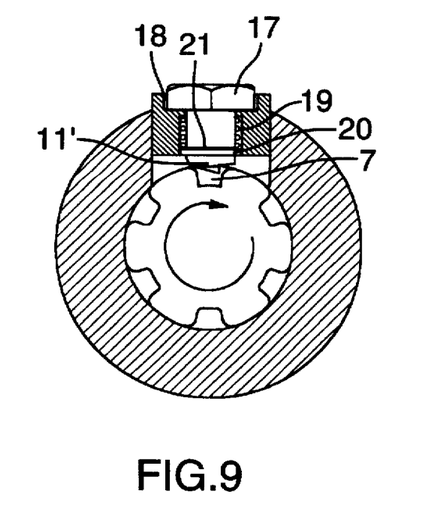
FIG. 9 is a cross-section at C—C of FIG. 8, showing the pin extending into the spline.
Figure 10:
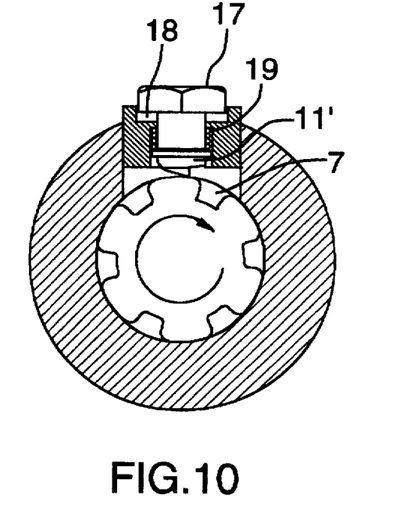
FIG. 10 is another cross-section at C—C of FIG. 8, showing the pin ratcheted out of the spline.
Figure 11:
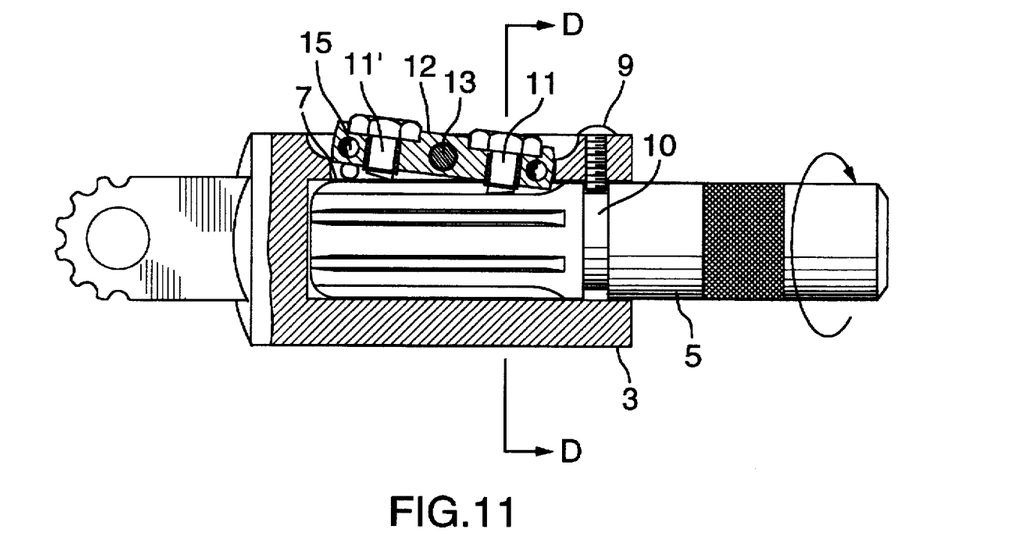
FIG. 11 is a cross-section showing the rocker depressed in the other direction.
Figure 12:
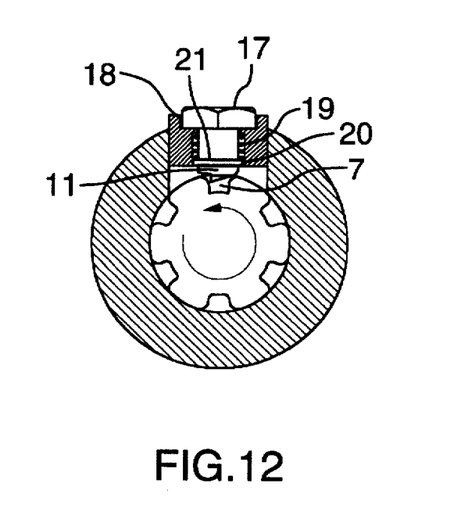
FIG. 12 is a cross-section at D—D of FIG. 11.
Figure 13:
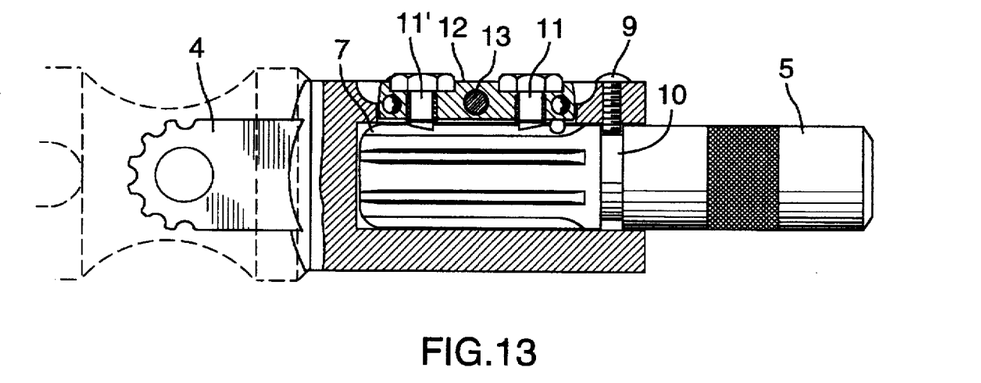
FIG. 13 is a cross-section showing the rocker in the central position.
Figure 14:
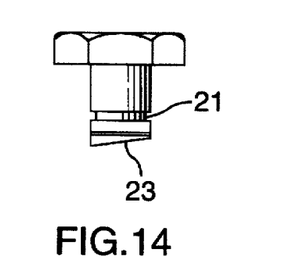
FIG. 14 is a side view of one of the pins.
Figure 15:
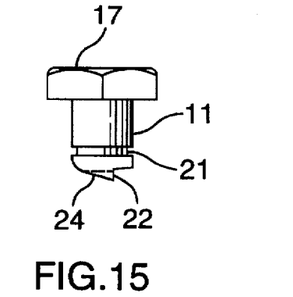
FIG. 15 is a view of the FIG. 14 pin at 90 degrees to FIG. 14, i.e. looking along the axis of the body.
Figure 16:
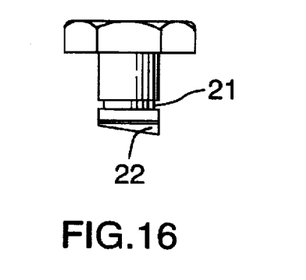
FIG. 16 is a side view of the other pin.
Figure 17:
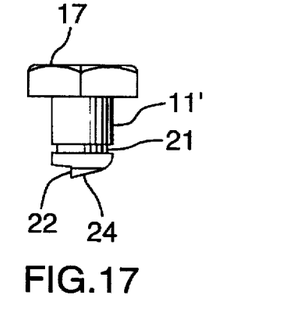
FIG. 17 is a view of the FIG. 16 pin at 90 degrees to FIG. 16, i.e. looking along the axis of the body.

FIGS. 14–17 show the pins themselves in more detail. As seen from the side of the screwdriver, i.e. in FIGS. 14 and 16, the pins have an angled bottom 23, configured so that when the rocker is pivoted to position a pin in the splines, the bottom of the pin is approximately parallel to the bottom of the splines, for maximum engagement. As seen from the viewpoint of axis of the tool, i.e. as in FIGS. 15 and 17, the pins present a ramp 24 in one direction, to permit ratcheting, and a flat surface 22 parallel to the axis of the pin to catch on a spline to prevent ratcheting.

The rocker can be activated manually, or by an overlying slide (not illustrated), or by a lever arrangement connected thereto (also not illustrated).

The above description relates to preferred embodiments by way of example only. However, it should be apparent to those knowledgeable in the field that many variations are possible, without departing from the spirit of the invention. Such variations are intended to be within the scope of the invention as claimed, whether or not expressly described above.

For example, instead of using a rocker, it should be appreciated that the same effect could be achieved by having two mechanically interlocked buttons, such that when one button is fully depressed, the other button is fully released, and such that when one button is half-way depressed, the other button is also in the half-way position, such that the ratchet mechanism is locked in both directions as in the LOCKED position of the preferred embodiment.

What is claimed as the invention is:

1. A ratchet mechanism, comprising:
    a body having a generally cylindrical axial opening in a distal end thereof;
    an output shaft having a splined portion secured rotatably within said opening, said splined portion having a plurality of axial splines;
    two pins mounted on a rocker for radial movement through a wall of said body into and out of said splines, said pins being configured such that one pin permits rotation of the splined portion in a first direction and prevents rotation in the opposite direction, and the other pin permits rotation in the opposite direction and prevents rotation in the first direction;
    said rocker being pivotally mounted to pivot between two extreme positions about a lateral axis, in which positions one or the other of the pins extends fully into the splines, and said rocker being positioned at least partially within said wall of said body so as to restrict any rotation about the axis of said body.

2. A ratchet mechanism as recited in claim 1, where said rocker has an intermediate position between said extreme positions, in which intermediate position said pins each extend sufficiently into said splines to prevent rotation in their respective rotation-preventing directions.

3. A ratchet mechanism as recited in claim 1, where said rocker is sufficiently secured in each extreme position via a seating to substantially restrict accidental dislocation therefrom.

4. A ratchet mechanism as recited in claim 2, where said rocker is sufficiently secured in each extreme position and in said intermediate position via a seating to substantially restrict accidental dislocation therefrom.

5. A ratchet mechanism as recited in claim 3, where said seating is by virtue of a ball-spring arrangement between said rocker and said wall, one of said rocker and said wall having a spring-biased ball arranged to engage one of at least two depressions in the other of said rocker and said wall.

6. A ratchet mechanism as recited in claim 4, where said seating is by virtue of a ball-spring arrangement between said rocker and said wall, one of said rocker and said wall having a spring-biased ball arranged to engage one of three depressions in the other of said rocker and said wall.

7. A ratchet mechanism as recited in claim 1, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

8. A ratchet mechanism as recited in claim 2, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

9. A ratchet mechanism as recited in claim 3, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

10. A ratchet mechanism as recited in claim 4, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

11. A ratchet mechanism as recited in claim 5, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

12. A ratchet mechanism as recited in claim 6, where said pins each have an angled bottom as viewed from a side of the mechanism, such that when said rocker is pivoted to position a pin in the splines, the bottom of the pin is approximately parallel to the bottom of the splines, for maximum engagement, and where said pins as viewed from the axis of the mechanism present a ramp in one direction, to permit ratcheting, and a flat surface parallel to the axis of the pin to catch on a spline to prevent ratcheting.

* * * * *